United States Patent [19]

Harshberger, Jr. et al.

[11] Patent Number: 4,705,996
[45] Date of Patent: Nov. 10, 1987

[54] APPARATUS FOR POSITIONING A ROTATING ELEMENT

[75] Inventors: Robert P. Harshberger, Jr., San Jose; Bryan E. Loucks, Los Altos Hills; Kenneth G. Witte, San Jose, all of Calif.

[73] Assignee: Greyhawk Systems, Milpitas, Calif.

[21] Appl. No.: 916,909

[22] Filed: Oct. 9, 1986

Related U.S. Application Data

[63] Continuation-in-part of Ser. No. 915,072, Oct. 3, 1986.

[51] Int. Cl.⁴ ............................................. G05B 1/06
[52] U.S. Cl. .................................. 318/160; 318/600; 318/640; 250/237 G
[58] Field of Search ............... 318/159, 160, 640, 646, 318/632, 616, 600; 356/346; 250/237 G

[56] References Cited

U.S. PATENT DOCUMENTS 3,922,603 11/1975 Lesur ................................... 318/646
3,956,682 5/1976 Van Dyck ........................... 318/640
4,180,774 12/1979 Odone et al. ................... 318/640 X
4,236,105 11/1980 Wilkinson ....................... 318/640 X
4,655,587 4/1987 Wijhtjes .......................... 318/640 X Primary Examiner—Benjamin Dobeck
Attorney, Agent, or Firm—Flehr, Hohbach, Test, Albritton & Herbert

[57] ABSTRACT

The position of a rotating element is controlled by a galvanometer and a servo system. The position of the rotating element is determined by using a two-grating moire pattern. Movement of the element causes a projected scale image representing radiation reflected from the element to shift relative to a fixed grating thereby generating moire fringes. The accumulated fringes serve to measure absolute position and motion of the element. The servo digitally processes the measured position to generate several force components which are then combined to control the amount of force applied by the galvanometer to rotate the element.

8 Claims, 8 Drawing Figures

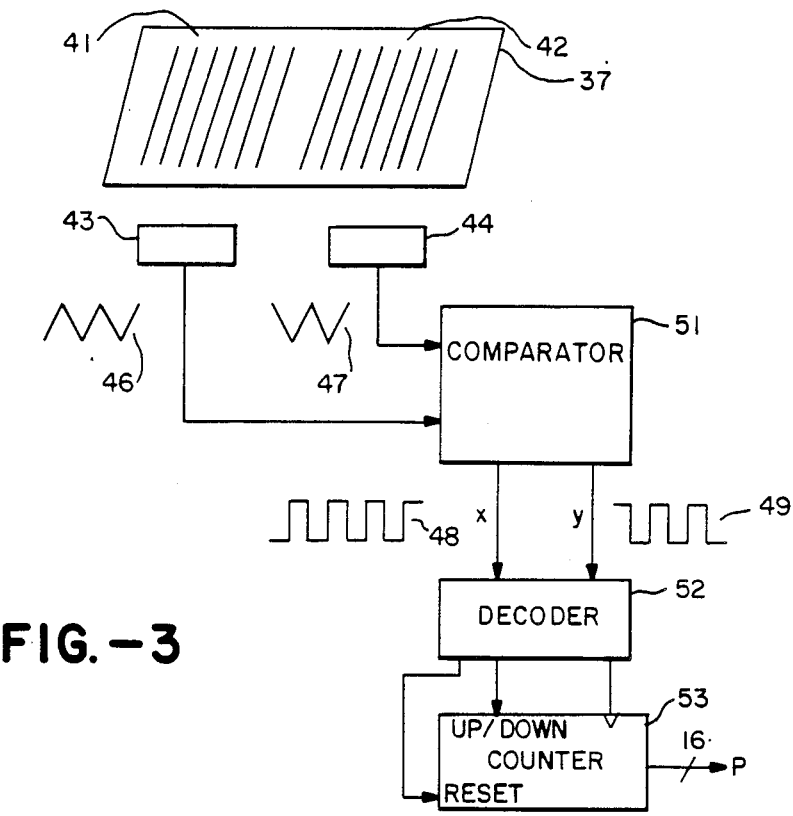
FIG.-3
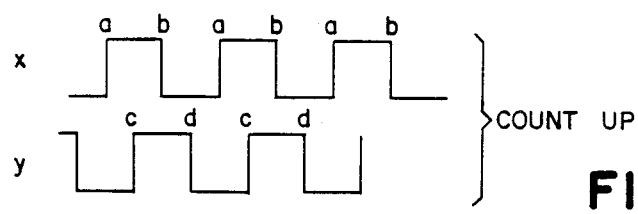
FIG.-4A
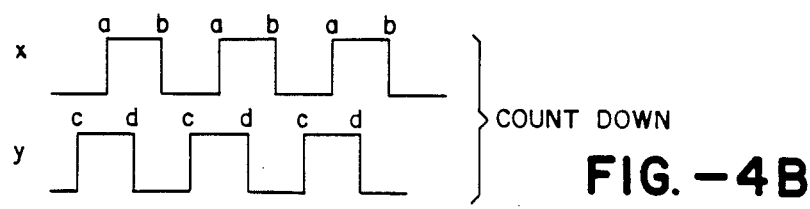
FIG.-4B
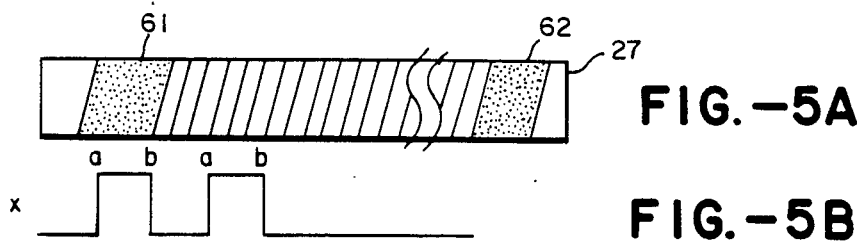
FIG.-5A
FIG.-5B

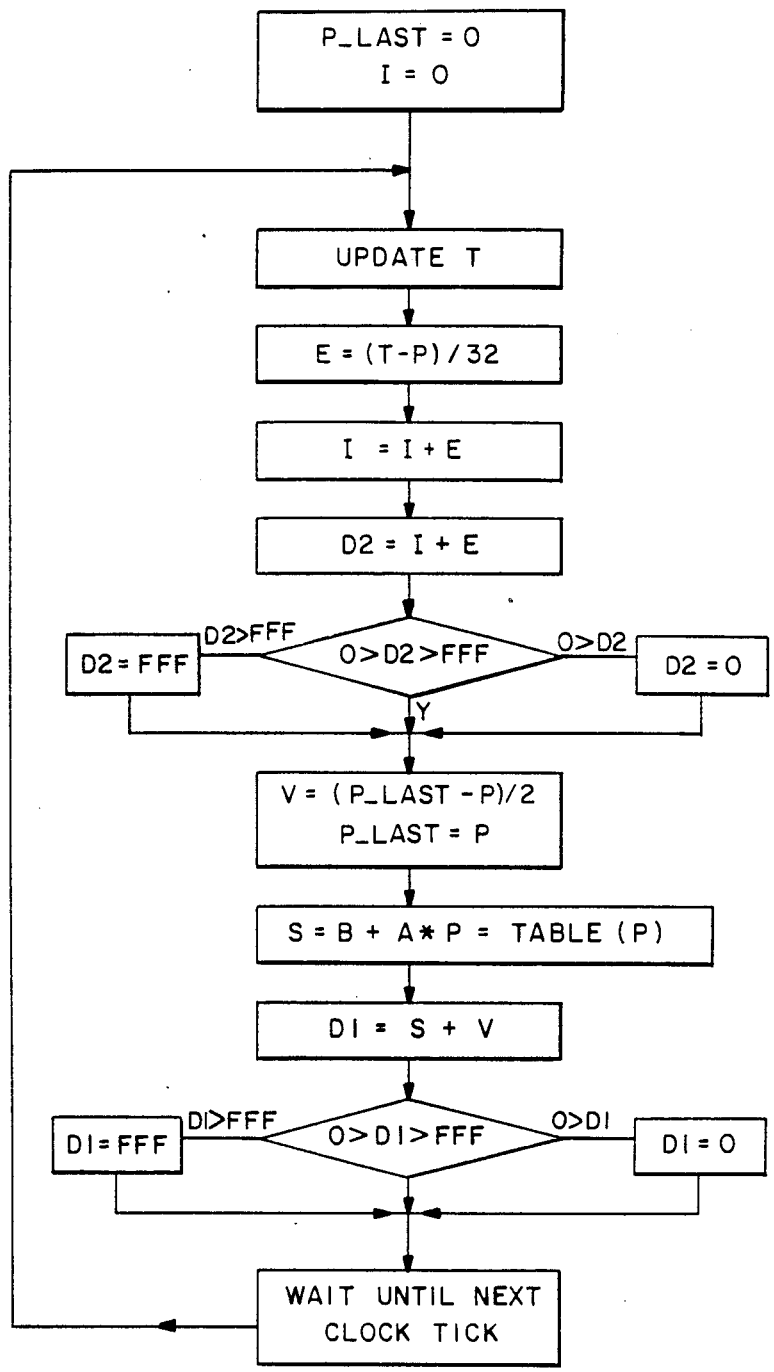
FIG.—6

APPARATUS FOR POSITIONING A ROTATING ELEMENT

This is a continuation-in-part of an application entitled Apparatus for Detecting Position of a Rotating Element, Ser. No. 915,072, filed Oct. 3, 1986, which is hereby incorporated by reference in its entirety.

This invention relates to an apparatus and method for positioning a rotating element and more particularly to an apparatus and method for positioning a galvanometer shaft.

BACKGROUND OF THE INVENTION

In the preferred embodiment, the present invention is used in a data display system which employs a laser beam to thermally write on a high resolution liquid crystal light valve. In this system, two galvanometers are used to rotate two mirrors which reflect the laser beam onto the liquid crystal at a specified target position. The positioning system for controlling where the laser writes on the liquid crystal, such as the one disclosed herein, requires a very precise servo for controlling a galvanometer or other motor, and an equally precise position senor.

Various systems use light sources and light responsive devices for registration of data and data display. These systems incorporate finally focused light beams or laser beams that are employed for scanning and addressing light responsive surfaces. The scanning pattern can be along a single dimension, or over two dimensions of an X-Y plane, for example. When the beam is moved relative to the light receiving surface, it is generally necessary to determine accurately the position of the moving beam.

For example, in liquid crystal display technology, a scanning laser beam is used to thermally write on a high resolution liquid crystal light valve. Such displays can be selectively erased at a writing speed determined in part by the scanning speed of the beam. In another application, laser beams are used to scan photoresist for forming circuit board wiring configurations. In these types of applications, it is necessary to detect precisely the position of the beam.

Electromechanical galvanometer scanner systems have been used in the past to scan the laser beam light beam. The galvanometer systems incorporate a mirror for reflecting the laser beam in combination with a galvanometer for rotating the mirror. In one implementation, the position of the galvanometer shaft and the mounted galvanometer mirror can be determined by using a capacitance-based sensor, which consists of four electrodes surrounding an electrically grounded rotor. Movement of the galvanometer rotor produces differential currents in opposing electrode pairs, thereby generating a signal that is proportional to position. However, this approach does not take into account the flexing of the mirror or the shaft, the mechanical motion of the shaft axis, or any distortions which may be introduced by optical elements included in the galvanometer assembly. In addition, the speed of response to the galvanometer rotor movement is limited because of the added mass.

Another approach is to use an interferometric method wherein a coherent laser beam is reflected from a galvanometer mirror. The reflected light is modulated as the galvanometer mirror is moved. The spatial frequency of a grating determines the positional resolution. However, the disadvantage of interferometric methods is that they require coherent light, and therefore are expensive. In addition, such systems have less reliability than those using simple incoherent sources such as incandescent lamps.

Still another approach is to support a first grating on the rotatable member and a second grating mounted so that it is spaced from the first grating. Each grating includes transparent and opaque regions. Light is projected through the gratings and a photodetector senses the light which passes through the gratings. As the gratings move with respect to one another, a moire pattern is formed with the transmitted light increasing and decreasing in intensity depending upon whether the transparent and opaque regions overlap or are interleaved. The frequency of the output signal is a measure of the relative velocity and the number of cycles is a measure of the relative distance moved. A major problem with the prior art is that the gratings or other elements are generally mounted for movement with the moving or rotating member. This adds mass and increases the inertia of the movable member inhibiting its performance.

It is a general object of the present invention to provide a position sensor for sensing the position of a rotatable element which employs light reflected from the movable element rather than including an additional element mounted for rotation therewith.

Another problem with prior art systems is that the inherent instabilities of galvanometer servo systems have limited their accuracy and speed of operation. The present invention overcomes some of these difficulties by using a servo which incorporates a digital processor to determine the galvanometer's drive current and by using a servo configured to automatically minimize positioning error.

SUMMARY OF THE INVENTION

In accordance with the invention, the position of a rotating shaft such as a galvanometer shaft is sensed by means of a two-grating system that provides a moire or fringe pattern. The drive current of the galvanometer is determined by a servo which uses a digital processor to compute the difference between a target position and the shaft's current position, and several other terms related to that difference.

In accordance with another feature of the present invention, the movable member includes a reflecting surface which reflects a pattern of a first fixed grating onto a second fixed grating where light is passed or intercepted by the second fixed grating depending on whether the light falls in the opaque or transparent regions of the second fixed grating.

BRIEF DESCRIPTION OF THE DRAWINGS

The foregoing and other objects of the invention will be more clearly understood with reference to the accompanying drawings in which:

FIG. 3 is a block diagram of the electrical system associated with the apparatus of FIG. 2 which serves to provide information regarding position and velocity of the rotating shaft.

FIGS. 4A and 4B show the waveforms at the output of the comparator of FIG. 3.

FIGS. 5A and 5B show a grating and waveform for finding a preselected galvanometer position.

FIG. 6 is a flow chart of the computational procedure used by the preferred embodiment of the galvanometer servo.

DESCRIPTION OF THE PREFERRED EMBODIMENT

Figure 1:
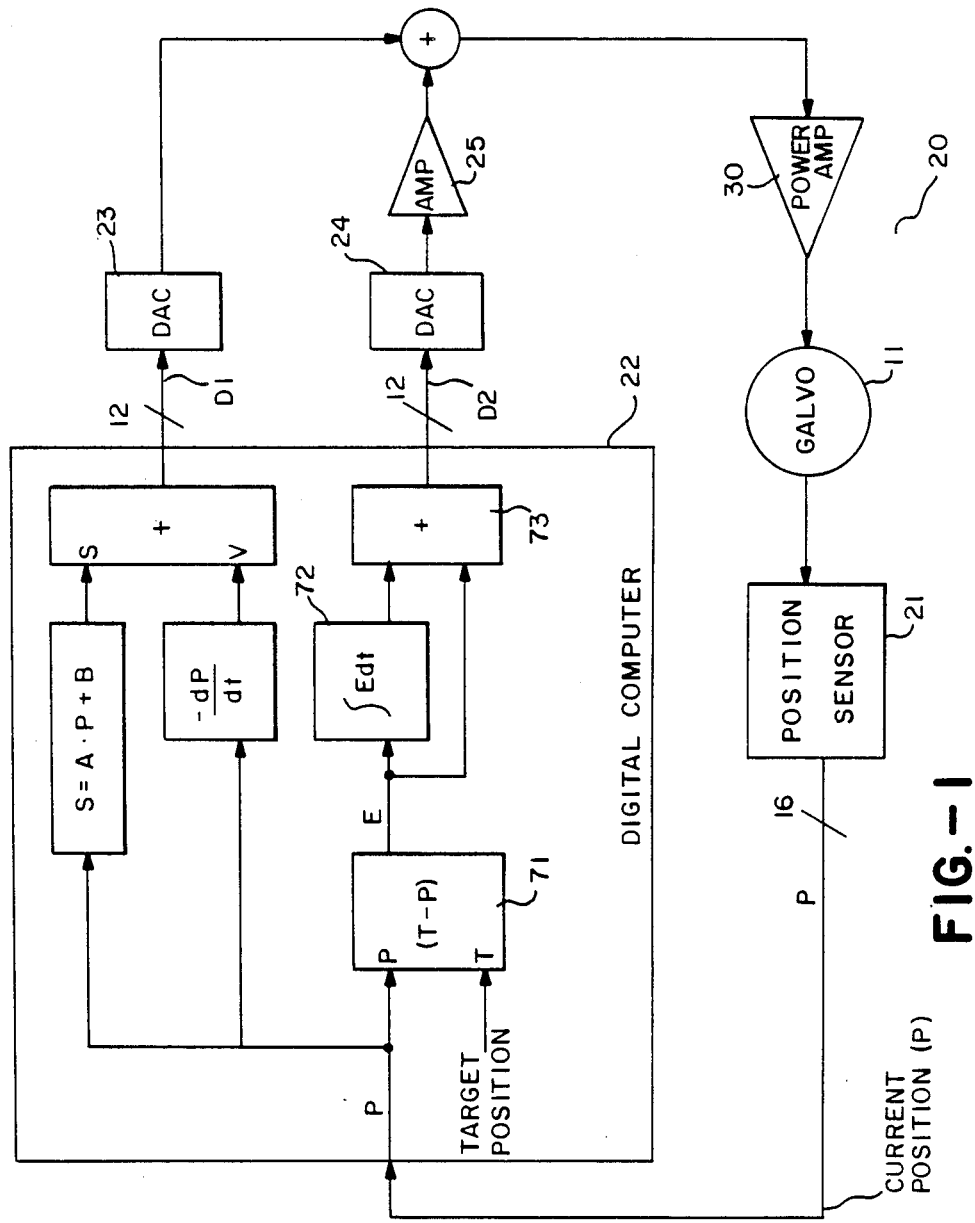
FIG. 1 is a block diagram of a galvanometer servo system in accordance with the present invention.

Referring to FIG. 1, there is shown a block diagram of a galvanometer servo system 20 in accordance with the present invention. A galvanometer 11 develops a rotational position which is generally proportional to the drive current applied to the galvanometer 11. However, the galvanometer 11 is a electronmechanical device which is inherently unstable, and thus needs a servo mechanism 20 which responds to the galvanometer's actual rotational position P. The actual rotational position P of the galvanometer shaft is measured by a position sensor 21, which is discussed in detail below with reference to FIGS. 2-4.

In the preferred embodiment, the measured rotational position P is processed by a digital computer 22 to produce two drive signals D1 and D2. Both D1 and D2 are converted into analog voltage signals by digital to analog converters 23 and 24. The second of these two signals D2 is also processed by a compensation amplifier 25 before the two signals are summed and fed into a power amplifier 30, which develops the current that drives the galvanometer 11. The operation of the servo 20 will be described in more detail below, after the operation of the position sensor 21 is explained.

It should also be understood that in the preferred embodiment of the present invention, two galvanometers are used to reflect a laser beam onto a liquid crystal at a specified X,Y position. One galvanometer controls the X position of the laser beam, and the other controls the Y position. Thus the galvanometer control system shown in these Figures is duplicated in the preferred embodiment.

POSITION SENSOR

Figure 2:
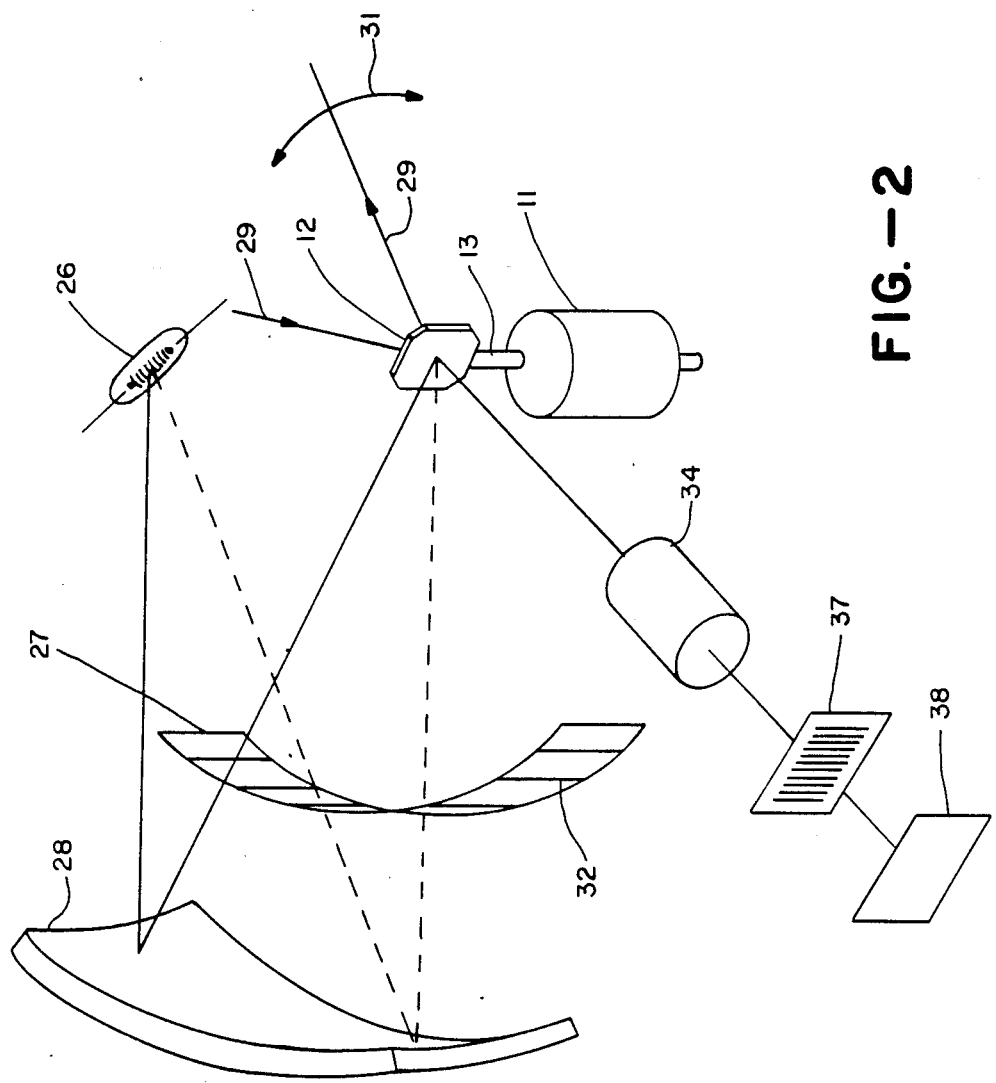
FIG. 2 is an isometric view of a position sensing apparatus in accordance with the present invention.

FIG. 2 shows a preferred embodiment of the position sensing portion of the present invention. As shown, a galvanometer 11 has a mirror 12 attached to the end of its shaft 13. One side of the mirror (the side facing toward the right and into FIG. 2), called the front surface of the mirror 12, is used to reflect a laser beam, while the side facing the viewer of FIG. 2, called the rear surface of mirror 12, is used by the positioning system 21 to reflect the image of a first grating 27 onto another grating 37.

A light source 26 is located so that it illuminates concave mirror 28. A first grating 27 is positioned such that the light from the source 26 which is reflected by the concave mirror 28 passes through the grating and projects an image of the grating onto the polished rear surface of the galvanometer mirror 12. The front reflecting face of the galvanometer mirror serves to receive laser beam 29 and reflects and scans the beam as shown by arrow 31. The beam can be scanned responsive to a control signal to scan an associated liquid crystal cell or the like.

The grating or scale consists of transparent substrate with opaque lines 32 having a spatial frequency determined by the degree of resolution desired for the position detector. The image of the scale that is projected on the mirror 12 is reflected into a projection lens 34 which performs the function of collecting and focusing the reflected image of the grating 27 onto the second grating 37. A photodetector 38 receives the light which passes through the grating 37.

Referring to FIG. 3, the grating 37 consists of two sections: 41 and 42, each of which consists of regularly alternating transparent and opaque areas having the same spatial frequency but at a spatial phase difference of 90° as the image of the grating 27. Photodetector 38 consists of two separate detectors 43 and 44 located immediately adjacent to the sections 41 and 42, respectively.

The photodetectors may be photodiodes which receive the light transmitted through the grating.

The output signals 46 and 47 generated by the detectors 43 and 44 are a function of the light that passes through the scale sections 41 and 42, respectively. The effect of this arrangement is such that the image of both gratings 27 and 37 are superimposed and focused upon the detectors.

When the galvanometer mirror moves, it reflects a different portion of the image of grating 27 onto grating 37. This has the effect of causing alternating dark and light areas to pass across the grating 37. When the light areas are aligned with the opaque areas of the scale, the light that reaches the detectors is minimum. When the light areas of the image or scale are aligned with the transparent portions of the grating 37, maximum light reaches the detectors. The amplitude of the light reaching the detectors varies in a triangular pattern in the manner aforementioned. The number of cycles of light to dark is a measure of the number of elements of the grating that have passed a given point on the grating, that is, a measure of the rotation and the frequency of the cycles is a measure of the velocity of movement of the mirror 12.

The direction of movement of the mirror may be determined by quadrature effects which are best described with reference to FIGS. 3 and 4. Referring to FIG. 3, the grating 37 consists of two sections: 41 and 42. Each section consists of regularly alternating transparent and opaque areas having a spatial frequency determined by the resolution desired for the detector. Sections 41 and 42 are spatially located 90° or 270° out of phase with respect to one another, that is, the signal 46 generated by the photodetector 42 which is positioned adjacent to the section 41 is 90° out of phase with the signal 47 generated by photodetector 44 which is located adjacent the area 42. The signals are supplied to a comparator circuit 51. This type circuit is well known and effectively converts signals 46 and 47 to squarewaves 48 and 49 while retaining the original frequency and phase relationship. A decoder 52 receives the two signals and determines the direction of travel. This is more clearly illustrated in FIGS. 4A, 4B. FIG. 64 shows the waveform for rotation of the shaft in a first direction while FIG. 4B shows the signal for rotation of the shaft in the opposite direction. The letters a, b, c and d show the rising or falling portions of the rectangular waves. The direction of motion is determined as follows:

| Direction 1 Up Count | $a \cdot \overline{Y} + b \cdot Y + c \cdot X + \overline{d} \cdot \overline{X}$ |
|---|---|
| Direction 2 Down Count | $a \cdot Y + \overline{b} \cdot \overline{Y} + c \cdot \overline{X} + \overline{d} \cdot X$ | where

. = logical "and"
+ = logical "or"
— = low for X or Y and falling for a, b, c, or d.
no bar = high for X or Y and rising for a, b, c, or d.

When the transitions are sorted as above, the output of the comparator is applied to an up-down counter 53. The parallel clock output P will represent the relative net motion of the mirror in either direction. The sixteen bit output P of the up-down counter can be used as a feedback signal to control the galvanometer 11 and, therefore, the position of the mirror whereby the deflection of the beam 29 is controlled.

Referring to FIGS. 5A and 5B, in the preferred embodiment the first grating 27 includes a dark section 61 or 62 on at least one end for the purpose of fixing a starting point for the counter 53. When this dark section 61 of the grate 27 is first imaged on grate 37, one of the two square wave signals 48 or 49 (depending on which side of the grate 27 is being focused on the second grate 37) will stop oscillating and will remain low in spite of continued movement of the mirror. The decoder 52 detects this condition, and resets the counter 53, thereby making the counter value equal to the mirror's position (i.e., the galvanometer's angular position) relative to the position at which the counter 53 is reset to zero.

The two-grating system disclosed herein enables the use of an incandescent lamp as a light source and thus a position sensor that is relatively simple and inexpensive when compared to interferometric methods presently used. Errors due to the shaft and mirror deflection are virtually eliminated. The system disclosed herein being simple and compact in design affords easy alignment and relatively low temperature sensitivity. The galvanometer of the present invention enables precise determination of the instantaneous position of the light beam 29, thereby allowing adjustment of the position of the galvanometer and reflecting face of the mirror connected to the shaft. In this way, the light beam which is reflected from the mirror can be translated and directed to the desired location of a surface being scanned.

SERVO SYSTEM

Referring FIGS. 1 and 6, the sixteen bit position signal P is processed as follows. Note that the functional computation blocks in FIG. 1 represent software in the preferred embodiment. FIG. 6 is a flow chart of the computational procedure followed by the digital computer 22 as part of the galvanometer's servo system 20.

In the preferred embodiment, the calculations shown in FIG. 6 are repeated once every 125 microseconds, i.e., at a rate of 8 kilohertz. Note that the target position may be changed at the beginning of each computational cycle. This allows the system to slowly and smoothly move the galvanometer shaft to a new position.

A summer 71 subtracts P from a target value T to generate an error signal E. In the preferred embodiment, the error E is calculated as $$E=(T-P)/32.$$

The target value T is equal to the position that the system is driving the galvanometer toward. The magnitude of the error signal E is proportional to the distance between the current galvanometer position and its target position. Note that the error signal is scaled by a factor, 32, which is selected to provide a stable but fast servo system.

The error signal E is numerically integrated by integrator 72 using the formula:

$$I=I+E.$$

Then a summer 73 calculates a signal called D2 by summing the error signal E and the integration signal I. Note, however, that the summer 73 is designed to prevent D2 from falling below 0 or from exceeding $FFF_{16}$, because D2 is used as the input to a 12 bit DAC (digital to analog converter) 24.

As will be understood by those skilled in the art of designing servo systems, because the D2 signal contains second and third order components, it must be phase shifted in order to stabilize the galvanometer 11. Therefore the output of DAC 24 is processed by a compensation amplifier 25 before it is used to control the galvanometer 11.

For those not skilled in the use of galvanometers, the following background information is given. First, galvanometers generally have a spring on their shafts. The spring resists rotation of the shaft. To keep the shaft at a specified angular position, the force required is $$F=K*P$$

where F is the force used to counterbalance the spring, K is a constant value called the spring constant, and P is the angular displacement of the shaft from its resting position. It should also be noted that the force developed by a galvanometer is approximately linearly related to the current applied to the galvanometer:

$$F=L+(C*I)$$

where L and C are constant values, and I is the current. As a result, the amount of current needed to counterbalance the shaft spring can be represented as:

$$I=B+(A*P)$$

where A and B are constant values.

Therefore the digital computer 22 develops a value S for developing the amount of current needed to hold the galvanometer steady at its current position, with S equal to $$S=B+(A*P)$$

as indicated above. In the preferred embodiment multiplication is a time consuming process. Instead, S is calculated by using the value of P (actually, P/16) as the index for a table look up.

Note that in an alternate embodiment of the invention, a spring compensation term could be used which is proportional to the target position rather than the current position.

Next, a term V, which is proportional to the angular velocity of the galvanometer shaft is calculated by substracting the current position P from the shaft position during the previous computation cycle (Plast) and dividing the result by two:

$$V=(Plast-P)/2$$

Then V and S are summed to generate a signal called D1, which is clipped in the same fashion as D2, discussed above. D1 is converted into an analog signal which is summed at a summing junction with the output of the compensation amplifier 25. The resulting summed analog signal is the input to the power amplifier 30 which drives the galvanometer 11. Note that the D1 term is not compensated the way the D2 term is compensated, because the neither the spring compensation term S, nor the velocity term V, introduce instabilities which need such compensation. In fact, the velocity term is used as a negative feedback that damps the galvanometer's tendency to oscillate.

The above described servo system uses digital processing to advantage in several ways. While digital processing normally is considered to give poor high frequency response in system such as the one described above, there is no high frequency problem in the preferred embodiment because the sampling rate is sufficiently high. In particular, the servo system's unity gain crossover point is about 800 hertz in the preferred embodiment, while the sample rate is 8000 hertz.

On the low frequency end, the digital processing used herein has the advantage that the integrator's low frequency pole is at zero hertz. An analog integrator would have a pole well above zero hertz.

Another advantage of the present invention is that the servo automatically operates to reduce the position error signal to zero. As will be understood by those skilled in the art, in prior art servo systems the integrator is an analog integrator which is part of the compensation amplifier. Therefore it is the output of the integrator, which is the input to the compensation amplifier, which is normally driven to zero by the servo. However, it is a zero position error that is the real goal of the servo.

Still another advantage of using digital processing in the servo is that it reduces the system's signal to noise requirements. In the preferred embodiment, the servo has approximately 32,000 distinct positions, and the system is required to have a positioning accuracy of two units—i.e., an accuracy of about 1/16,000. The signal to noise ratio needed for this type of servo is about 110 db in analog implementations, but only 20 db in the preferred digital implementation.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For example, in a servo system having a time varying gain, the "constants" used to scale the error signal, velocity signal, and so on could be made time dependent values which have values corresponding to the current gain value.

What is claimed is:

1. Apparatus for positioning a rotatable element comprising:
    means for rotating said element, including a restoring spring which resists the rotation of said element;
    position sensing means for developing a position signal indicative of the position of said rotatable element shaft;
    digital processing means for periodically performing the steps of
        developing an error signal proportional to the difference between a specified target position and said position signal;
        developing an integration signal by integrating said error signal;
        developing a velocity signal by differentiating said position signal; and
        developing a spring force compensation signal proportional to said position signal; and
    means for applying rotational force to said rotatable element including
        means for generating a first signal proportional to the sum of said integration signal and said error signal;
        means for phase shifting said first signal;
        means for generating a second signal proportional to the sum of said phase shifted signal, said spring force compensation signal, and said velocity signal; and
        means for applying rotational a force to said rotatable element proportional to said second signal.

2. Apparatus for positioning a rotatable element comprising:
    means for rotating said element, including a restoring spring which resists the rotation of said element;
    position sensing means for developing a position signal indicative of the position of said rotatable element shaft, including
        reflecting means mounted for rotation with said element;
        first and second fixed gratings;
        light means for projecting the pattern of said first fixed grating onto said reflecting means, from whence it is reflected onto said second fixed grating, whereby light is passed by said second fixed grating to the extent that the light portions of said first grating pattern fall in the transparent regions of said second fixed grating, thereby generating a fringe pattern; and
        means for detecting said fringe pattern and generating a position signal from said fringe pattern;
    digital processing means for periodically performing the steps of
        developing an error signal proportional to the difference between a specified target position and said position signal;
        developing an integration signal by integrating said error signal;
        developing a velocity signal by differentiating said position signal; and
        developing a spring force compensation signal proportional to said position signal; and
    means for applying rotational force to said rotatable element including
        means for generating a first analog signal proportional to the sum of said integration signal and said error signal;
        means for phase shifting said first analog signal;
        means for generating a second analog signal proportional to the sum of said phase shifted signal, said spring force compensation signal, and said velocity signal; and
        means for applying rotational a force to said rotatable element proportional to said second analog signal.

3. A system as in claim 2, wherein said position sensing means includes:
    a source of light;
    a first fixed grating having a regular pattern of areas that are transparent and opaque to the radiation from said source;

a second fixed grating having a pattern of areas that are transparent and opaque to the radiation of said light source;

means for projecting an image of said first grating onto said second grating, said means including said reflecting means and arranged such that the pattern from said first grating moves across said second grating at a rate proportional to the rate of motion of said reflecting means whereby the intensity of light passing through said second grating varies in a regular pattern proportional to the rate of motion of said reflecting means;

detector means located such that light passing through said second grating falls thereon, said detector means being adapted to produce electrical signals proportional to the intensity of light passing through said second grating.

4. A system as in claim 2, wherein said position sensing means includes;

reflecting means mounted for rotation with said element;

a light source for providing radiation;

a concave mirror for receiving said radiation from said source, and for directing said radiation onto said reflecting means;

a transparent scale having opaque areas interposed between said concave mirror and said reflecting means, said radiation from said concave mirror being transmitted through said transparent scale to form an image of the scale;

a second transparent scale having opaque areas arranged to receive the image of the transparent scale reflected from said reflecting means to generate fringe patterns; and means for receiving the fringe patterns and generating an output signal.

5. A system as in claim 4, wherein said light source is an incandescent lamp.

6. A system as in claim 4, including means for receiving said signal and counting up said fringe patterns when said rotating element rotates in one direction, and for counting down said fringe patterns when said rotating element rotates in the opposite direction.

7. A system as in claim 2, wherein said position sensing means includes:

a source of light directed to said reflecting means;

a first grating means responsive to the rotation of said reflecting means and the reflected light from said reflecting means, said grating means forming a pattern that varies as said reflecting means is rotated;

a second grating means fixed in position relative to said rotating means;

means for projecting the pattern of said first grating means onto the pattern of said second grating means so that fringe patterns are formed; and means for sensing said fringe patterns to determine the position and of said reflecting means.

8. A system as in claim 7, wherein said source of light is an incandescent lamp and said system further includes a concave mirror for reflecting the light from said incandescent lamp through said scale back onto said reflecting means.

* * * * *